United States Patent [19]

Miskinis

[11] 4,390,500
[45] Jun. 28, 1983

[54] ROTARY EVAPORATOR SHAFT

[76] Inventor: Robert J. Miskinis, 9758 Airport Vista Rd., Santee, Calif. 92071

[21] Appl. No.: 305,617

[22] Filed: Sep. 25, 1981

[51] Int. Cl.³ .......................... B01D 3/00; B01L 3/08; B01L 11/00
[52] U.S. Cl. .................................... 422/103; 215/296; 81/3.1 R; 81/3.1 C; 81/3.34; 202/238; 422/99
[58] Field of Search .................. 285/18; 215/295, 296; 422/99, 103; 138/96 R, 96 T; 29/237, 256, 234, 426.5; 81/3.1 R, 3.1 C, 3.34; 202/238

[56] References Cited

U.S. PATENT DOCUMENTS

| 2,374,348 | 4/1945 | Harding | 285/332 |
| 2,801,017 | 7/1957 | Cortat | 215/296 |
| 3,323,874 | 6/1967 | Phillips | 422/103 |

FOREIGN PATENT DOCUMENTS

| 1948393 | 4/1971 | Fed. Rep. of Germany | 202/238 |
| 9792 | of 1891 | United Kingdom | 215/296 |

Primary Examiner—Michael S. Marcus
Attorney, Agent, or Firm—George J. Rubens

[57] ABSTRACT

A rotary evaporator shaft having tapered coupling surfaces for coupling to a rotary drive and to a container includes an extracting device disposed between the tapered coupling joints and moveable into engagement with a selected one of the container or the drive means for extracting the coupling therefrom with the shaft constructed of a synthetic resin polymer such as that sold under the trademark TEFLON.

2 Claims, 4 Drawing Figures

ROTARY EVAPORATOR SHAFT

BACKGROUND OF THE INVENTION

The present invention relates to chemistry laboratory equipment and pertains particularly to improved couplings for ground glass couplings.

Glassware in the form of vessels, flasks tubing and the like is used extensively throughout chemical laboratories. It is often desirable to set up systems connecting two or more vessels together for the transfer of liquids or gases between vessels. Glass tubing is normally used for such purposes and couplings are typically in the form of tapered ground glass couplings. Such couplings are normally tapered a slight amount typically known as standard taper to insure a secure fit. It is frequently necessary to seal the joint to prevent escape of liquid pressurized gas and the like. Such sealing is frequently accomplished by means of a coating of silicone grease.

The use of silicone grease and other similar sealing methods is undesirable due to the potential contamination thereof and also because such couplings frequently result in the inability to separate the joints. This frequently results in broken vessels and tubing and can result in injury.

The use of silicone grease also makes clean up both time consuming and unpleasant. The grease also tends to cause the adaptors and stoppers to freeze such that they cannot be removed without breakage of the vessel and coupling.

Rotary evaporators use a hollow glass shaft having taper at both ends for coupling to a drive motor and to a glass flask from which a liquid is evaporated. It is usually necessary to establish a good seal between the glass flask and the coupling or shaft. This frequently results in breakage of the flask when attempting to remove it from the shaft. The hollow shaft serves also as a conduit for conveying the vapor from the vessel to a condsensing column. Such glass shafts have the same coupling problems as other ground glass couplings.

It is therefore desirable that an improved evaporator shaft be available.

SUMMARY AND OBJECTS OF THE INVENTION

It is therefore the primary object of the present invention to provide an improved evaporator shaft.

In accordance with the primary aspect of the present invention an evaporator shaft is constructed of a polymer resin, and includes spaced apart tapered coupling joints with a threaded cylindrical portion therebetween with a threaded nut member moveable on the threaded portion for selectively extracting the shaft from a coupled joint.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
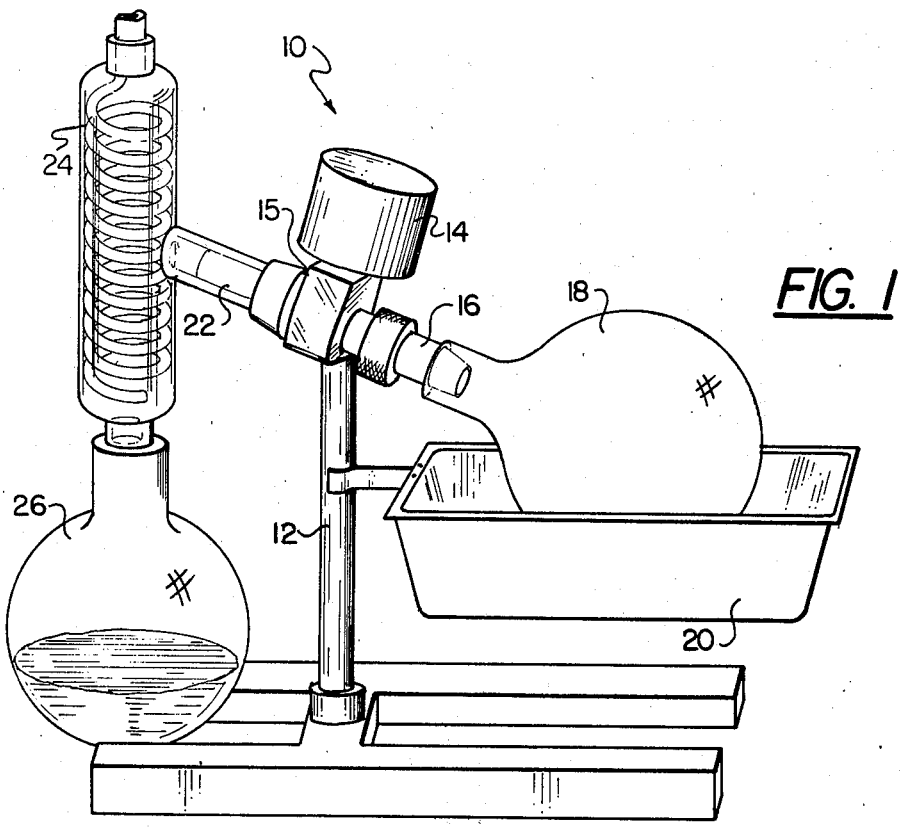
FIG. 1 is a perspective view of ann evaporating apparatus incorporating the subject invention.

Turning to the drawings there is shown in FIG. 1 a rotary evaporator designated generally by the numeral 10 and comprising a base or stand 12 on which is supported a drive assembly including a motor 14 and drive gear or coupling 15. A rotary shaft 16 is coupled to the drive unit 15 and to the neck of a evaporator flask 18. The coupling is by way of a standard coupling joint as will be described. The flask is immersed in a bath of water or other liquid in a bath container 20 which may have suitable heating means not disclosed. The rotary shaft is in communication with a tube 22 which communicates with a condenser unit 24 having a receiving flask 26 coupled thereto.

The evaporator unit functions to speed the evaporation of a liquid from the evaporating flask 18 which continuously rotates within a heated bath for evaporating a liquid or the like wherein the vapor is collected and condensed in the condenser 24.

Figure 2:
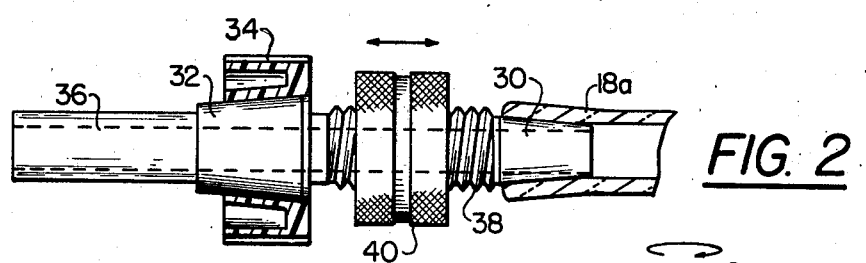
FIG. 2 is a side elevation view of the shaft FIG. 1 with portions broken away to show details.

Turning to FIG. 2 details of the rotary shaft and its couplings are illustrated. As specifically illustrated the shaft 16 includes a tapered flask coupling end 30 which is coupled in the usual manner to the neck 18a of the flask 18. The drive coupling portion 32 of the shaft is coupled into a drive member such as a gear 34 which is driven by the motor 14. The outer end or cylindrical extension 36 extends into and is sealingly connected to the tube 22. The shaft is constructed of a synthetic polymer resin of the type sold under the trademark TEFLON. Because of this material, the tapered joints seal and engage so tightly that they cannot usually be removed by hand.

Disposed between the two coupling members or surfaces 30 and 32 is an extractor unit in accordance with the invention which comprises a generally cylindrical threaded portion or section 38 on which is threadably mounted an extraction nut or member 40. This nut 40 is moveable along the threaded portion 38 for selective engagement with the neck 18a of the flask 18 or the drive coupling 34 for applying a co-axial force for extracting the shaft from the respective couplings. This extractor device makes polymer resin shafts practical by providing means for separating the couplings.

Figure 3:
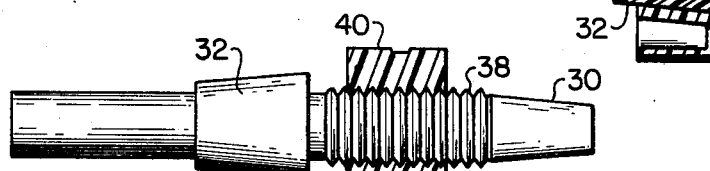
FIG. 3 is a side elevation view of the shaft of the present invention.

Turning to FIG. 3 as shown in the illustrated embodiment the coupling section 30 is smaller in its maximum diameter than the cylindrical threaded portion 38 and this portion is smaller than the maximum diameter of coupling surface 32.

Figure 4:
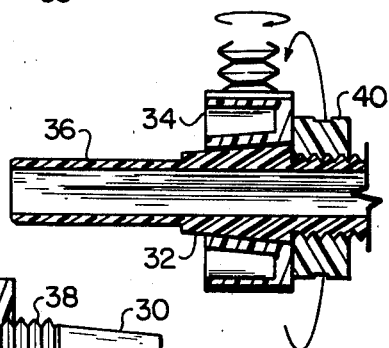
FIG. 4 is a side detail view in section of a portion of FIG. 2.

Turning to FIG. 4 there is illustrated the action of the extraction member 40 in engaging the drive member 34 for extraction of the shaft from the drive unit. The member 40, when rotated, travels axially along the threaded portion 38 applying a co-axial force to the drive member 34 forcing them apart.

The extraction member 40 in its alternate extracting position is in engagement with the upper rim of neck 18a of the flask 18 for extracting the flask coupling portion 30 from the neck of the flask.

The above described extraction structure is essential for polymer resin coupling members made of TEFLON as above described. Such members when inserted in a coupling provide a secure sealed coupling that cannot normally be extracted by hand without the use of an extracting member as described. Thus, the TEFLON rotary shaft can with the extraction assembly can be utilized for replacement of the standard glass shaft for most applications.

While I have illustrated and described my invention by means of a specific embodiment it is to be understood that numerous changes and modifications may be made therein without departing from the spirit and scope of the invention as defined in the appended claims.

I claim:

1. A joint extractor assembly for separating male to female, ground glass to polymer resin, joints having standard tapers comprising in combination:

a polymer resin hollow cylindrical member having two spaced apart end tapered male joint surfaces and an intermediate threaded portion; said tapered joints being tapered outwardly from the intermediate threaded portion respectively to engage complementary tapered female surfaces of members to be joined;

an extractor nut threadedly mounted, and axially movable in either direction, on the intermediate threaded portion of the cylindrical member;

said extractor nut being dimensioned to initially engage an end of either female member for applying an axially force on said female members to enable the male members to be withdrawn from their respective female member.

2. The joint extractor assembly of claim 1 wherein:

said polymer resin joint member is a rotary evaporation shaft having a co-axial bore therethrough;

one of said joint surfaces is a glass flask connecting joint; and the other of said joint surfaces is a rotary drive coupling joint.

* * * * *